United States Patent [19]

Izumi et al.

[11] Patent Number: 4,539,668

[45] Date of Patent: Sep. 3, 1985

[54] DEVICE FOR LOADING AND EJECTING A DISC IN A DISC PLAYER

[75] Inventors: Yutaka Izumi; Hiroshi Kawakami, both of Fujisawa, Japan

[73] Assignee: Tokyo Shibaura Denki Kabushiki Kaisha, Japan

[21] Appl. No.: 419,408

[22] Filed: Sep. 17, 1982

[30] Foreign Application Priority Data

Sep. 18, 1981 [JP] Japan .................... 56-146293

[51] Int. Cl.³ ................... G11B 17/04; G11B 1/04
[52] U.S. Cl. ........................................ 369/75.2
[58] Field of Search .............. 369/75.2, 75.1, 78, 369/77.1, 77.2

[56] References Cited

U.S. PATENT DOCUMENTS

| | | | |
|---|---|---|---|
| 3,811,686 | 5/1974 | Watanabe | 369/75.2 |
| 3,846,836 | 11/1974 | Masse et al. | 360/98 |
| 4,314,588 | 2/1982 | Speich | 139/79 |
| 4,360,907 | 11/1982 | Yamamura | 369/77.2 |
| 4,408,316 | 10/1983 | Saito | 369/77.2 |

FOREIGN PATENT DOCUMENTS

| | | | |
|---|---|---|---|
| 891428 | 12/1981 | Belgium | |
| 724985 | 1/1966 | Canada | 369/75.2 |
| 2373121 | 6/1978 | France | |
| 44-10424 | 12/1969 | Japan | 369/78 |
| 245308 | 1/1926 | United Kingdom | 139/66 R |
| 568193 | 3/1945 | United Kingdom | 139/79 |
| 792458 | 3/1958 | United Kingdom | 139/79 |
| 944560 | 12/1963 | United Kingdom | 369/77.1 |
| 316785 | 1/1972 | U.S.S.R. | 139/82 |

*Primary Examiner*—Steven L. Stephan
*Attorney, Agent, or Firm*—Finnegan, Henderson, Farabow, Garrett & Dunner

[57] ABSTRACT

A disc carriage for use in a disc player is provided with a pair of surfaces coming into contact with a disc when the disc is inserted or ejected from the disc player. The pair of surfaces are other than parallel and are symmetrically disposed about a center plane oriented in the direction of loading and ejecting the disc so that only peripheral edge portions of the disc contact the pair of surfaces. A second pair of surfaces disposed opposite to the first pair of surfaces can also be arranged in a non-parallel position, symmetrically disposed about the center plane, to cooperate with the first pair of surfaces so that only peripheral edge portions of the disc contact either pair of surfaces.

8 Claims, 8 Drawing Figures

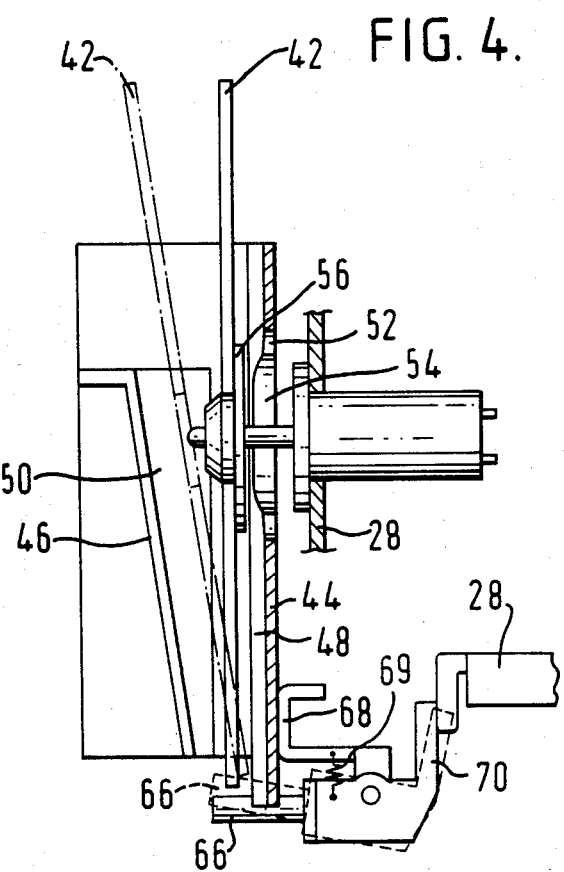

DEVICE FOR LOADING AND EJECTING A DISC IN A DISC PLAYER

FIELD OF THE INVENTION

This invention relates to a disc player, and more particularly to a device, such as used for positioning a phonograph record, a video record, a digital audio record or a magnetic record on a turntable in a disc player.

BACKGROUND OF THE INVENTION

Analog and digital record discs are sensitive to scratches and dust, and therefore they must be handled with care. Preferably such discs should be contacted only on the peripheral edge or on the central portion where no information is recorded. Therefore, in disc players the disc should not contact, touch or rub against any part of the player. This requirement makes the construction of automatic loading and ejecting devices for record discs more complicated.

Devices have been developed for receiving record discs so that only the peripheral portions of such discs come in contact with any portion of the disc player. Also automatic loading and ejecting devices have been developed for efficiently loading or ejecting the discs from the record player. It is especially important for video record discs and digital audio discs which have very minute and high density information recorded thereon to be handled automatically and in a manner not to damage such information.

Some conventional loading and ejecting devices are constructed with carriers for the discs which move between two positions. Such holders have surfaces on which the record discs are received in a sliding manner. However, these holders have disadvantages in that the information bearing portions of the record disc are often rubbed and marred by the sliding motion on the surfaces of the carrier.

SUMMARY OF THE INVENTION

The present invention overcomes the problems and disadvantages of the prior art by providing a device which operates both automatically and without the drawback of damaging the information contained on the record disc. It is an object of the present invention to allow for easy and automatic loading and ejection of a disc before and after operation of the disc player.

To achieve the objects and in accordance with the purpose of the invention, as embodied and broadly described herein, the device for loading and ejecting the disc of this invention comprises a chassis and means for carrying the disc which is attached to the chassis and movable between a loading and an ejecting position. This means has a pair of surfaces for receiving the disc which are other than parallel and are symetrically disposed about a center plane oriented in the direction of loading and ejecting the disc so that only the peripheral edge of the disc contacts the pair of surfaces. The device further comprises means for engaging the disc during loading which is responsive to the movement of the means for carrying the disc so as to disengage from the disc when loaded into the carrying means.

The accompanying drawings, which are incorporated in and constitute a part of the specification, illustrate one embodiment of the invention and, together with the description, serve to explain the principles of the invention.

BRIEF DESCRIPTION OF THE DRAWINGS

FIG. 3($c$) is a longitudinal sectional view taken along lines X—X of FIG. 3($b$);

FIG. 4 is a cross-sectional view similar to that of FIG. 3($c$) further including the disc driving apparatus and disc engaging means.

DESCRIPTION OF THE PREFERRED EMBODIMENT

Reference will now be made in detail to the present preferred embodiment of the invention, an example of which is illustrated in the accompanying drawings.

Figure 1:
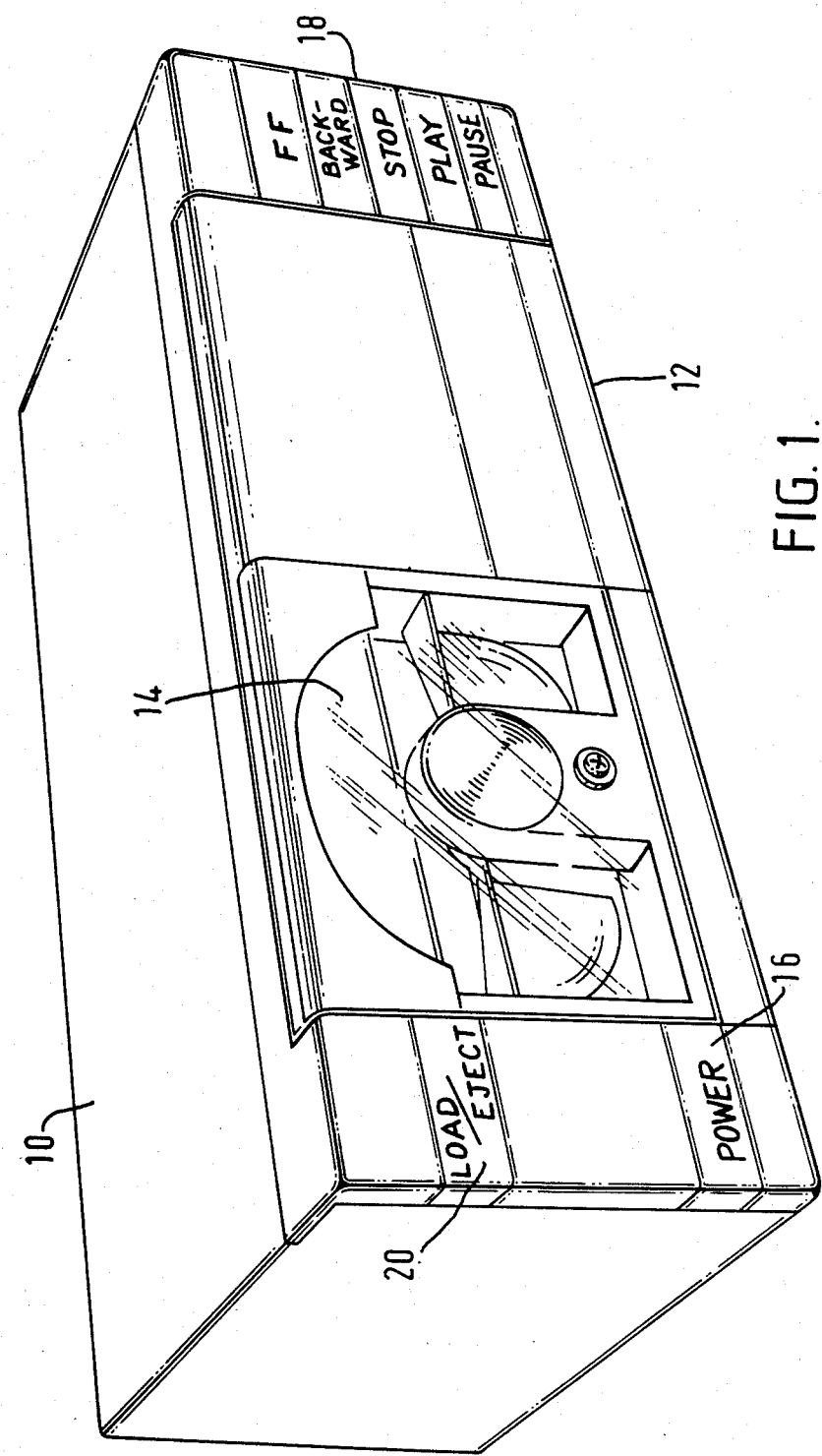
FIG. 1 is a perspective view of a digital audio disc player incorporating a device for loading and ejecting a disc according to the present invention.

A digital audio disc player which incorporates the disc loading and ejecting device of the present invention is shown in FIG. 1. The disc player is enclosed by casing 10 which has mounted thereon control panel 12 and disc carrying means 14. The disc carrying means 14 comprises a part of the automatic disc loading and ejecting device of the present invention which is described below in connection with the other drawings. Control panel 12 is provided with power switch 16, disc drive control section 18 and loading/ejecting button 20 for actuating the automatic disc loading and ejecting device to move the disc carrying device 14 into an operative or inoperative position.

Figure 2:
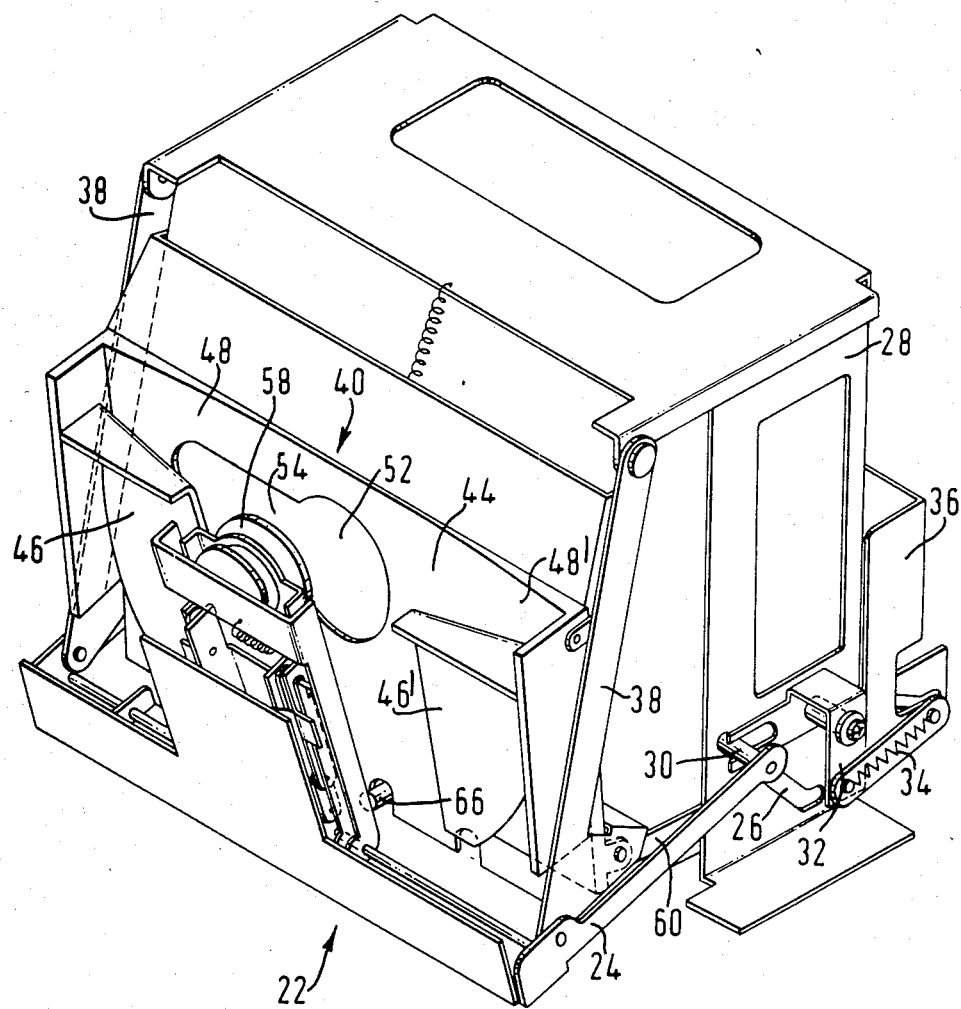
FIG. 2 is a prespective view of an automatic disc loading and ejecting device used in the digital audio disc player of FIG. 1 in which the disc carriage is in the ejecting position.

The preferred embodiment of the device for loading and ejecting a disc is shown in FIG. 2 and is represented generally by the numeral 22. This device includes a chassis 28 on which means for carrying a disc 40 is movably mounted.

A pair of drive rods 24, the rod on one side of the device only is shown, are engaged with guide slots 26 formed in each side of chassis 28 by means of respective pins 30 which are rigidly attached at the ends of the respective drive rods 24. Pin 30 is movable along guide slit 26, driven by drive levers 32 pivoted on each side of chassis 28 near the guide slots 26. The forked ends of levers 32 engage pins 30. The other end of drive levers 32 are pivotally connected to connecting rods 34. The connecting rods 34 in turn are pivotally connected to either side of drive slider 36. The drive slider 36 can be vertically moved by a motor not shown to cause loading and ejecting operation of the device through the movement of the above-described linkage. In FIG. 2 the device is shown with the drive slider 36 in its lowered position. The respective drive rods 24 are pivoted at their front ends to the free ends of support levers 38 which have their upper ends in turn pivoted to the upper portion of chassis 28.

Figure 3A:
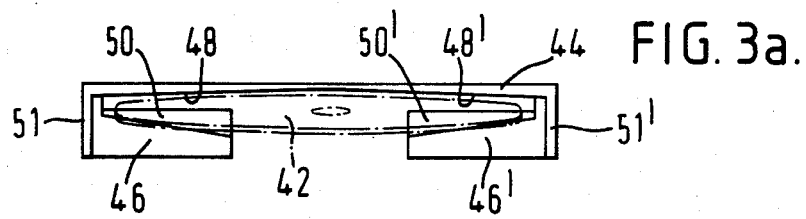
FIGS. 3($a$) and 3($b$) are respectively a top plan view and a front view of the disc carriage shown in FIG. 2.
Figure 3B:
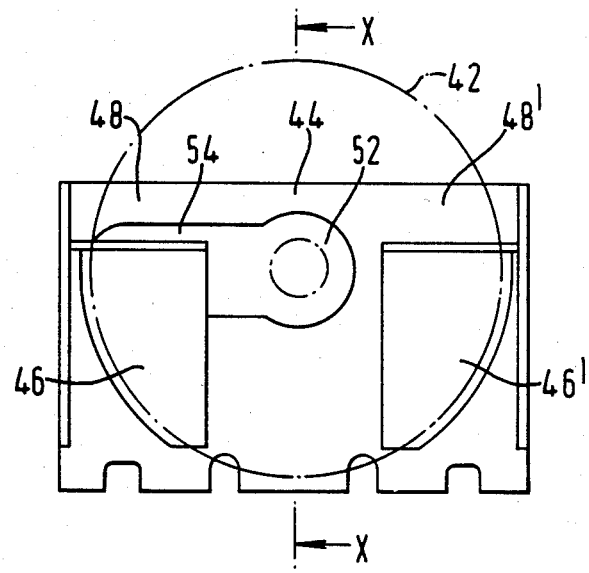
Figure 3C:
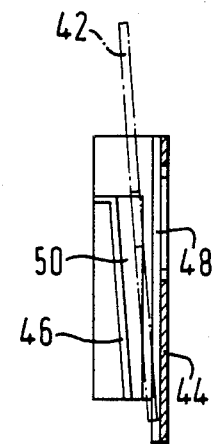

Means for carrying a disc is attached to chassis 28 by means of respective rods 38. As here embodied the carrying means is shown as pivoted disc carriage 40. As shown in FIG. 3($a$), 3($b$) and 3($c$) disc carriage 40 is adapted to receive a record disc 42. Disc carriage 40 has rear wall 44 and a pair of separated front walls 46 and 46' opposed to rear wall 44. The front walls 46 and 46' have interior first pair of surfaces 50 and 50' for receiving the disc 42 which are other than parallel and are symmetrically disposed about a center plane oriented in the direction of loading and ejecting the disc so that only the peripheral edges of disc 42 come in contact with the surfaces 50 and 50'.

Rear wall 44 has a second pair of surfaces 48 and 48' which are angled backwards from the respective side portions 51 of the disc carriage 40 toward the center of carriage 40. The second pair of surfaces 48 and 48' are disposed opposite to the first pair of surfaces 50 and 50'. The second pair of surfaces 48 and 48' are other than parallel to one another and are symmetrically disposed about a center plane oriented in the direction of loading and ejecting the disc 42. The second pair of surfaces 50 and 50' cooperate with the first pair of surfaces of front walls 46 and 46' so that only the peripheral edges of the disc 42 contact either pair of surfaces during loading and ejecting.

In the rear wall 44 of disc carriage 40 there is a central circular opening 52 connecting with a longitudinally extending opening 54. The central circular opening 52 allows turntable 56 to penetrate through wall 44, when the disc carriage 40 is in the operative position, into the disc carriage 40 as shown in FIG. 4. The longitudinally extending opening 54 allows for an optical pickup (not shown) to penetrate inside the disc carriage 40 when the disc carriage is in the operating position. Front walls 46 and 46' are separated by a sufficient distance to allow for disc clamper 58 (see FIG. 2) to move into disc carriage 40 when disc carriage 40 is in the operating position to properly position the disc 42. Disc clamper 50 comes in contact with record disc 42 and presses it against turntable 56 for clamping record disc 42 against the turntable 56.

Figure 5A:
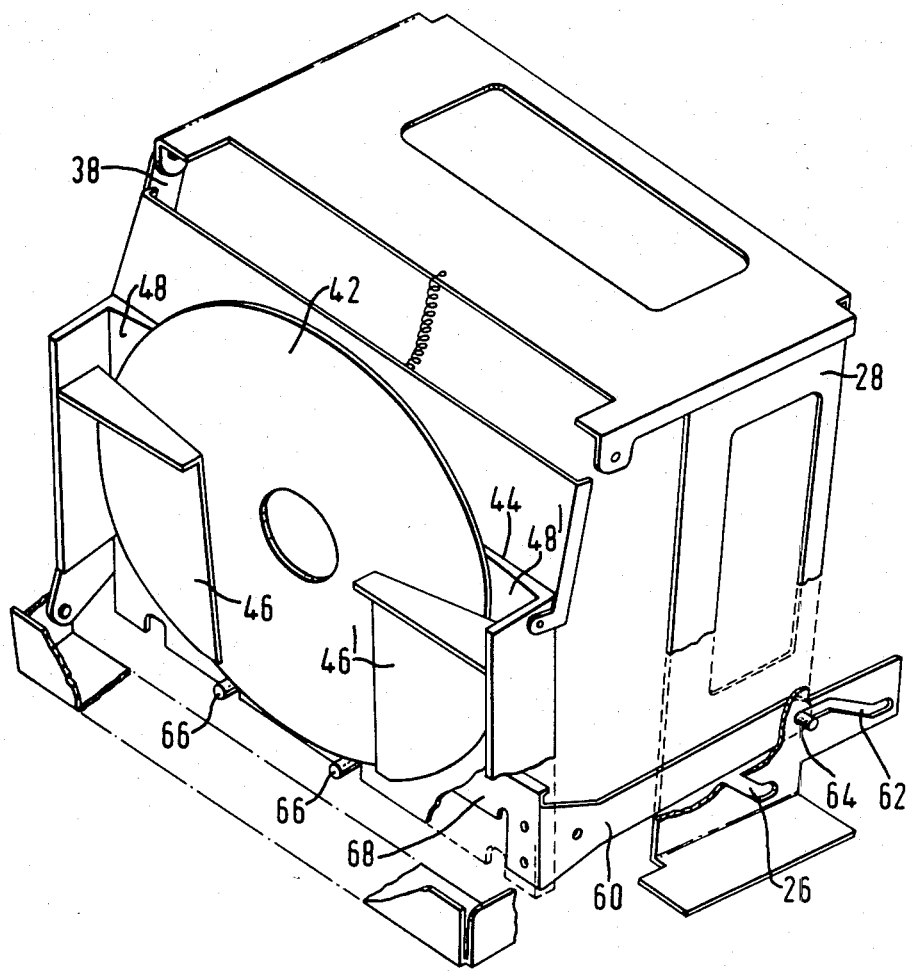
FIGS. 5($a$) and 5($b$) are views of the automatic disc loading and ejecting device respectively in a loading and an ejecting position.
Figure 5B:
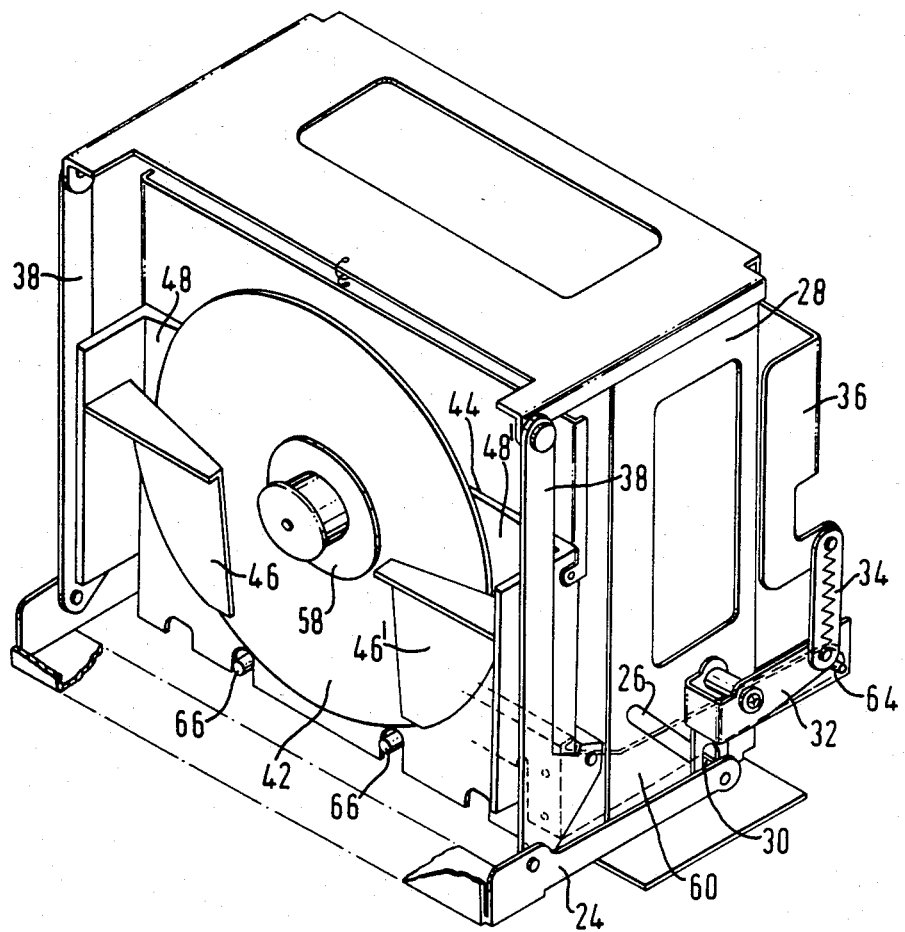

The disc carriage 40 is further attached on either side to respective first ends of guide rods 60 as shown in FIG. 5(a) (only one rod is shown in FIG. 5(a)). The respective ends of guide rod 60 are engaged by means of pins 64 with second pair of guide slits 62 formed on each side of chassis 28 (only one side of chassis 28 is shown in FIG. 5(a)). Pins 64 are attached to respective second ends of the guide rods 60. Pins 64 are movable along guide slits 62 when the disc carriage 40 is driven by drive rods 24 between the operative and the inoperative positions, i.e., the loaded and eject positions. Thus the orientation or inclination of carriage 40 with respect to chassis 28 is determined by the shape of guide slit 62. When disc carriage 40 is in the inoperative position, disc carriage 40 is inclined forward for easy ejection or loading of record disc 42. When the disc carriage 40 is in the operative position, disc carriage 40 is oriented perpendicularly with respect to chassis 28 as shown in FIG. 5(b).

FIG. 4 shows more clearly how record disc 42 is supported during loading and ejecting modes. In the inoperative position of this carriage 40, the record disc 42 (shown by a dotted line) is inclined forward against surfaces 50 and 50' of front walls 46 and 46'. At its lower peripheral portion record disc 42 is supported by a pair of support pins 66 shown by a broken line. The pair of support pins 66 are pivoted on beam member 68 which spans the width of chassis 28 connecting the pair of guide rods 60 and being biased in a clockwise direction by spring 69. In the operative position, record disc 42 is set on turntable 56 penetrating into disc carriage 40 when pushed by disc clamper 58 (not shown in FIG. 4). At that time support pins 66 are rocked counterclockwise by means of protruding portion 70 connected to support pins 66 and abutting against a portion of chassis 28. The result is that the support pins 66 move away from contact with record disc 42 which is then positioned on turntable 56 in an operative position.

According to the invention the aforementioned surfaces 48 and 48' of rear wall 44 ensure that the peripheral edge portion of record disc 42 are the only parts of the disc to come in contact with rear wall 44. This avoids any rubbing or injury to the information bearing part of the disc when it is placed inside disc carriage 40. Front walls 46 and 46', having surfaces 50 and 50' respectively, provide the same protection should the record have two sides of information or be inserted in a reverse manner.

What is claimed is:

1. A device integral with a disc player for loading and ejecting a disc in the disc player comprising:
   chassis means; and
   means for carrying said disc, said carrying means being attached to said chassis means and including a first wall having a first pair of surfaces for receiving said disc which are other than parallel and are disposed about a center plane, said center plane being, aligned orthogonally to the plane of said disc during loading and parallel to the direction of loading, so that only peripheral edge portions of said disc contact said first pair of surfaces.

2. The device of claim 1 in which said carrying means further includes a second wall having a second pair of surfaces disposed opposite to the first pair of surfaces which are other than parallel and are disposed about the center plane aligned orthogonally to the plane of said disc during loading and cooperate with said first pair of surfaces so that only peripheral edge portions of said disc contact said second pair of surfaces.

3. The device of claims 1 or 2 in which said means for carrying said disc is attached to said chassis to be movable between a loading and ejecting position.

4. The device of claims 1 or 2 wherein said disc player has a turntable and said device for loading and ejecting a disc further includes means pivotally attached to said carrying means for clamping the disc against said turntable in the loading position.

5. The device of claim 1 in which the first pair of surfaces of said first wall are symmetrically disposed about the center plane.

6. The device of claim 2 in which the second pair of surfaces are symmetrically disposed about the center plane.

7. A device for loading and ejecting a disc in a disc player comprising:
   chassis means; and
   means for carrying said disc attached to said chassis, wherein said means has an elongated aperture for receiving the disc, said aperture being widest substantially at a mid point of its long dimension and having opposed tapered sides spaced apart and approaching the thickness of said disc at their respective extreme ends.

8. A device for loading and ejecting a disc in a disc player comprising:
   chassis means; and
   means for carrying said disc attached to said chassis, said means including a first and a second wall opposed to one another wherein said second wall is inclined with respect to said first wall so that the respective internal surfaces of said first and second walls are tapered toward one another in the direction of loading said disc.

* * * * *